Sept. 15, 1942.    W. LEATHERS    2,295,533
METER READING APPARATUS
Filed Aug. 2, 1940    2 Sheets-Sheet 1

INVENTOR
Ward Leathers

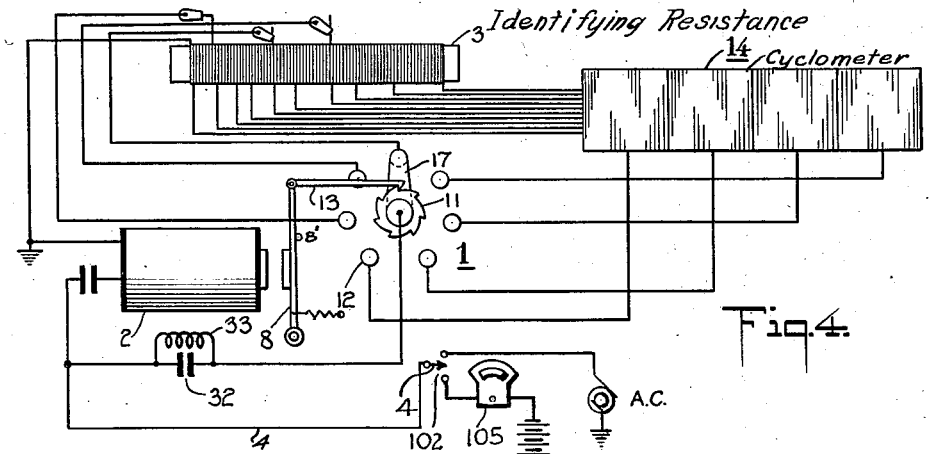
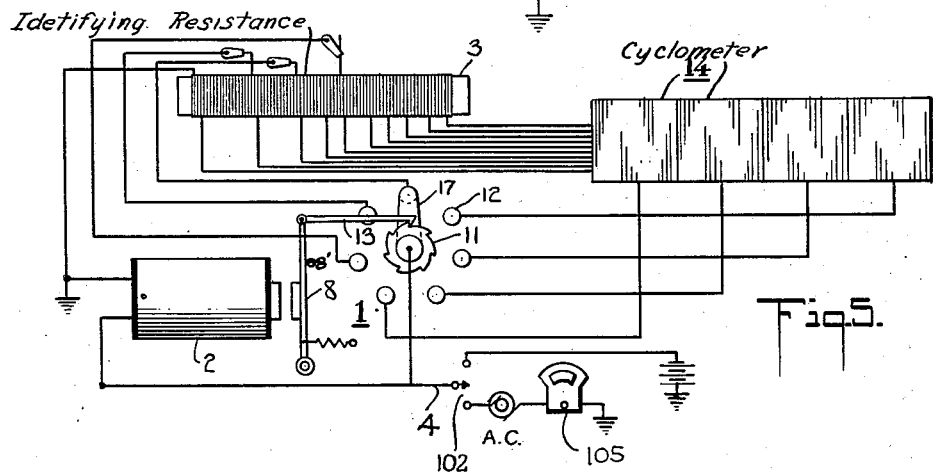
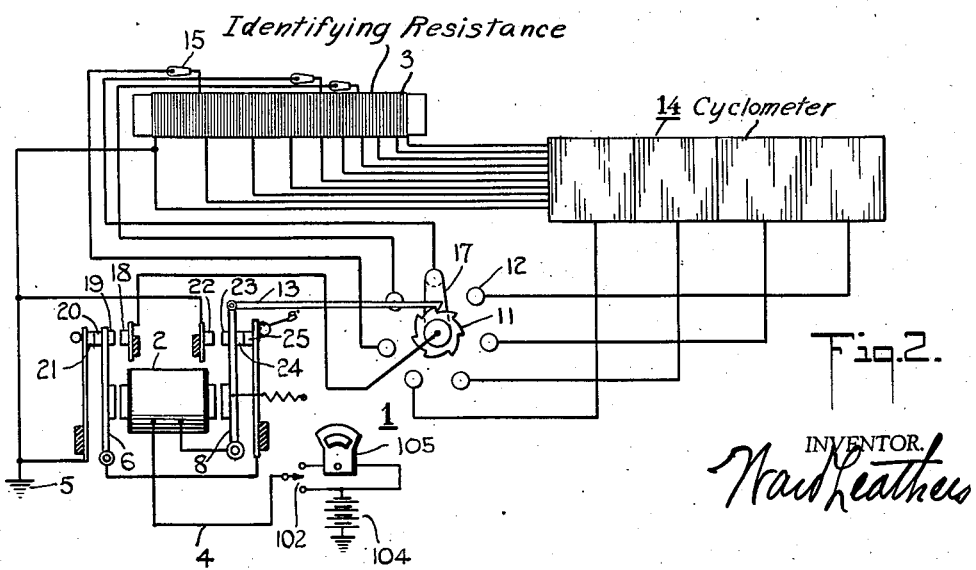

Patented Sept. 15, 1942

2,295,533

UNITED STATES PATENT OFFICE 2,295,533

METER READING APPARATUS

Ward Leathers, Brooklyn, N. Y., assignor, by mesne assignments, to International Business Machines Corporation Application August 2, 1940, Serial No. 349,980

2 Claims. (Cl. 177—351)

The present invention has to do with reading of consumer meters such as those for the recording of consumed units of electricity, gas, water, steam, etc. It is related to the group of devices which read these widely distributed meters from a central reading station by means of a wire. The portions of the wire reading system found at the reading or central station end are neither shown nor described in this specification but may be clearly understood by reference to a co-pending application for Letters Patent Serial No. 331,814, filed April 26, 1940, for Accounting apparatus by Ward Leathers and Archibald Gold.

The present invention concerns itself with the two-way function of pulse and read whereby a step-by-step pulse action permits the reading circuit to be successively joined by periodic indexing operations to various values of resistances representing a multiplicity of digits to be read one at a time and alternately or in-between the indexing operations permits the said reading without electrical interference on the part of the pulsing or indexing mechanism.

In the copending application for Letters Patent above referred to, the pulse and read functions have been maintained independent of each other by means of a time delay obtained in the pulsing mechanism during which period of time required for deenergizing the electro-magnet used for pulsing purposes, the magnet circuit is broken and the reading circuit established. The present invention concerns itself with these functions but they are obtained by other means than those referred to.

The object of the present invention is the same as that of the aforementioned copending application for Letters Patent, namely to read digits indicative of the identifying number of the meter and other digits representing the recorded consumption of the meter but to accomplish the same by means of a similar pulse and read cycle but without the time factor just referred to.

In carrying out the above mentioned objects the invention in one form thereof contemplates the provision of a common circuit for both the pulsing and reading functions and having associated therewith an indexing solenoid which serves the dual purpose of both performing the necessary indexing operation whereby the various values of resistances are potentially established in the circuit for subsequent reading, and of thereafter closing the circuit through the reading device or instrumentality to render the reading previously set up at the time the indexing operation was performed. Actuation of the solenoid to selectively perform its independent dual functions is effected by energizing the circuit in succession with current of different voltages.

The invention, in a modified form thereof, contemplates utilizing a common circuit for both the pulsing and reading functions, the circuit having associated therewith a solenoid which operates when energized to actuate the indexing mechanism to potentially establish the various resistance values in the circuit. A condenser in the circuit in series with the solenoid permits alternating current oscillations for energization purposes to pass to the solenoid but blocks any direct current impulse applied to the circuit. The reading instrumentality is responsive to a direct current impulse and as a consequence the alternate application of alternating current oscillations and of a direct current impulse to the circuit will effect the desired indexing operation and the supplementary independent reading indication.

Other modifications of the invention wherein current of varying characteristics are alternately applied to the circuit for performing the pulsing and reading functions respectively are contemplated as will appear presently.

In the accompanying drawings forming part of this application certain embodiments of the invention have been disclosed for illustrative purposes. In these drawings:

Figures 2, 3, 4 and 5 are similar diagrammatic views showing modifications of the same.

Figure 1:
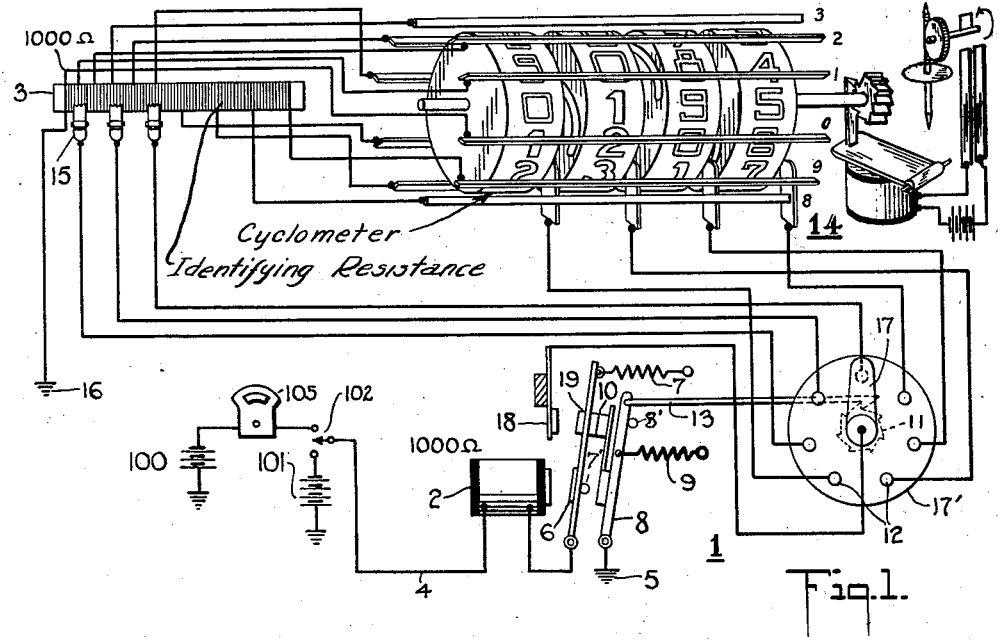
Figure 1 is a semi-schematic electric diagrammatic view showing one form of a means for reading meter indices by a pulse and read device constructed in accordance with the principles of the present invention.

In the meter to be read, ten resistances having progressively increasing values correspond respectively to the numerals 1—2—3—4—5—6—7—8—9—0. In order to identify a meter by three digits and read a registered figure of four digits, seven numerals must be read. These numerals in the present system are read separately by means of a remotely controlled step-switch or selector switch generally characterized by the 1, Figure 1, disposed in or near the meter which joins the seven resistances in the reading circuit to be read to the central station, one at a time. This switch is actuated by an electro-magnet 2. It is desirable to energize the coil of the magnet 2 and to read the values of the ten resistances at 3 over the same long line 4 from a central reading station, and a ground 5. When reading a resistance value at 3 it is possible to have the relay coil 2 entirely out of the circuit, but this can be accomplished only by delayed deenergizing of the coil during which time-interval the reading function of one numeral is performed as fully set forth in the copending application above referred to. In the present invention the coil of the magnet 2 is related to the circuit in such manner that its presence interferes least with the reading function. Likewise, the resistances are related to the circuit in such manner that the effect on the pulse function is minimized, i. e. the functions of pulse and read are substantially isolated from each other. By means of two armatures 6 and 8 of the magnet 2, the reading and pulsing may be done over the same wire without interference from the other. The armature 6 held in position by a light spring 7 makes contact by means of contact 10 with the heavier armature 8 held in position against a stop 8' by a heavier spring 9. Thus in the normal resting position of the armatures, as shown, a circuit is complete from the central station over the long wire 4, through the coil of the magnet 2, the armature 6, contact 10, armature 8, and ground at 5. From this position the selector switch I may be advanced one step by sending current of sufficient voltage through the circuit just traced to attract both armature 6 and armature 8. Armature 8 advances a switch arm 17 forming part of a selector switch 17' from contact to contact, as at 12, by means of a ratchet 11 and a pulling arm 13. Four values of resistance are tapped off of the resistor 3 by means of a cyclometer 14 which registers units of a consumed commodity. Small clips 15 tap three values of resistance off of the resistor 3 for purposes of meter identification. The seven resistances are then connected to the seven contacts 12 on the switch 1. The common wire of all the resistances is grounded at 16. The switch arm 17 is joined by an electrical conductor to a contact 18 which cooperates with a contact 19 on armature 6 when that armature is attracted by the relay 2. The reading is done by sending current through the coil of the magnet 2 of voltage that is insufficient to attract armature 8 yet has enough energy to attract armature 6. This is accomplished by reducing the actuating voltage as by batteries 100 and 101. With only armature 6 attracted, the reading circuit is complete from the central reading station through the long line 4, the relay 2, armature 6, contacts 18 and 19, the arm 17, the contact 12, the cyclometer 14, part or all of the resistor 3, to ground 16. Even with the highest reading resistance in the circuit, the magnet 2 will have enough power to attract armature 6 which does not do any heavy work and is held in position by a very light spring 7 or gravity, if desired. Reading of resistance values in resistor 3 is accomplished with the coil of the magnet 2 in series; pulsing is accomplished with no other resistance in the circuit. Thus the alternating of two D. C. voltages at the reading source enables the operator to progressively read the seven numerals in the meter by the method referred to in my copending application. The source or sources of energy for pulsing and reading may be arranged as desired. Suitable arrangements are as follows: Battery 100 of one voltage and 101 of another drawn upon selectively and alternately by means of the switch 102. Or one battery 104 (or other D. C. source) may be used selectively and alternately, by means of switch 102, through the reading volt-meter 105 or around the volt-meter. Or A. C. and D. C. sources may be used, Figures 3, 4 and 5, alternately and selectively as desired by means of the said switch.

A modification of the method just explained consists of having the two armatures on either end of the relay 2, as shown in Fig. 2. The method of operation is the same as in Figure 1. A high voltage applied at the central reading station will cause the magnet 2 to attract both armature 6 and armature 8. A lower voltage will attract only armature 6. In the normal position of the armatures a circuit exists from central reading station over the long line 4, through the coil of the magnet 2, armature 8, contacts 24 and 25, armature 6, contacts 20 and 21 to ground 5. When the higher voltage is applied sufficient current flows through the coil of the magnet 2 causing both armatures to be attracted. An auxiliary circuit is now established from the central reading station through long line 4, coil of the magnet 2, armature 8, contacts 23 and 22 to ground 5. Armature 6 in this position is inoperative. When a lower voltage is applied the coil of the magnet 2 will pass less current and have only enough energy to attract armature 6. Contacts 18 and 19 touch each other and now a circuit exists from the central reading station, through the long line 4, the relay 2, armature 8, contacts 24 and 25, armature 6, contacts 19 and 18, switch arm 17, contact 12, cyclometer 14, part or all of the resistor 3 to ground 5. All other factors are the same as in the method explained under Figure 1.

Figure 3:
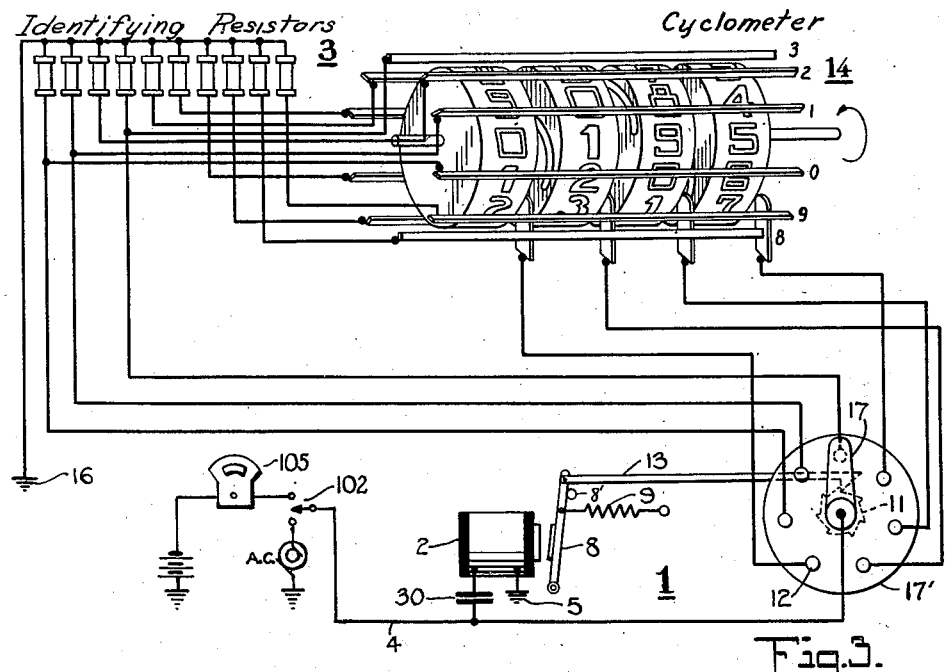

A further modification in the method of pulsing and reading consists of using alternating current for pulsing and direct current for reading the resistances. A condenser 30 blocks the D. C. from the coil of the magnet 2 as shown in Figure 3. When pulsing, A. C. is sent from the central reading station along the long line 4 through condenser 30, coil of the magnet 2, to ground 5. The A. C. will also go from line 4, through arm 17, contact 12, cyclometer 14, one of the ten values of resistance 3 to ground 16. The resistors in 3 have a relatively high ohmage with respect to the coil 2, therefore most of the current will go through the relay 2 making it actuate attracting the armature 8, thereby advancing switch arm 17 to the next contact 12, by means of ratchet arm 13 and ratchet gear 11. When D. C. is sent from the central reading station the only circuit that exists is through the long line 4, arm 17, contact 12, cyclometer 14, one of the resistors 3, to ground 16. Although A. C. has the effect of passing through a condenser, D. C. is positively blocked by a condenser. Therefore, when D. C. is used for reading it will not go through the coil of relay 2. Thus by isolating relay 2 from D. C. by means of condenser 30, the relay 2 is completely out of the reading circuit.

In the modified form of the invention shown in Fig. 4, a coil 33 and a condenser 32 are placed in the reading circuit and the inductance of the coil and the capacitance of the condenser are so chosen that the combination forms a parallel resonant circuit which is tuned at resonance to the frequency of the A. C. employed for the pulsing operation. Thus, the coil and condenser combination will offer a high resistance to the A. C. at the chosen frequency, but none (excepting that of the wire in the coil) to D. C. It is now possible to use lower resistance values at 3. Thus, when pulsing with A. C. the resistor 3 is substantially electrically isolated from the coil of the magnet 2.

A further modification consists of using A. C. for reading, and D. C. for pulsing. It is accomplished by putting the relay 2 and the resistances 5 in parallel as shown in Figure 5. The voltage of the D. C. and A. C. used is equal. When D. C. is applied, the relay will actuate, advancing the switch arm 17. When A. C. of the same voltage is applied, the coil of magnet 2 acts as a choke and will not pass enough current to actuate. Therefore, the A. C. is used for reading.

What is claimed:

1. In an apparatus for indicating at a remote point the relative position of a movable member, a plurality of resistances the values of which are correlated with different positions capable of being assumed by said member, an electric circuit including a wire to which electrical impulses are adapted to be applied and also including an indicator, a switch for sequentially connecting said resistances in the circuit, a solenoid including a coil, said solenoid being responsive to application of alternating current impulses for its operation, means connecting the solenoid and switch for actuating the latter upon energization of the former, means electrically connecting said coil in the circuit and to said wire including a blocking condenser, means for selectively applying direct current impulses to said circuit to cause the indicator to register the impedance value of the circuit as determined by said switch and alternating current impulses to the circuit to energize the coil and actuate said switch.

2. In an apparatus for indicating at a remote point the relative position of a movable member, a plurality of resistances the values of which are correlated with different positions capable of being assumed by said member, an electrical circuit including a wire to which current impulses are adapted to be applied and a source of ground, an indicator in said circuit, a switch for sequentially connecting said resistances in the circuit, a solenoid including a coil, said solenoid being responsive to application of alternating current impulses for its operation, means connecting one end of said coil to said wire including a blocking condenser, the other end of said coil being grounded, means connecting the solenoid and switch for actuating the latter upon energization of the former, one end of each resistance being connected to ground, an alternating current source having a grounded terminal and a direct current source also having a grounded terminal, and a switch for connecting said current sources selectively to said wire.

WARD LEATHERS.